(12) United States Patent
Förg (10) Patent No.: US 12,186,601 B2
(45) Date of Patent: Jan. 7, 2025

(54) FIRE PROTECTION SLEEVE SEGMENT AND FIRE PROTECTION SLEEVE

(71) Applicant: Hilti Aktiengesellschaft, Schaan (LI)

(72) Inventor: Christian Förg, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 891 days.

(21) Appl. No.: 17/298,694

(22) PCT Filed: Nov. 22, 2019

(86) PCT No.: PCT/EP2019/082225
§ 371 (c)(1),
(2) Date: Jun. 1, 2021

(87) PCT Pub. No.: WO2020/120104
PCT Pub. Date: Jun. 18, 2020

(65) Prior Publication Data
US 2022/0047904 A1 Feb. 17, 2022

(30) Foreign Application Priority Data

Dec. 10, 2018 (EP) ..................................... 18211215

(51) Int. Cl.
*A62C 2/06* (2006.01)
*F16L 5/04* (2006.01)
(52) U.S. Cl.
CPC ................ *A62C 2/065* (2013.01); *F16L 5/04* (2013.01)
(58) Field of Classification Search
CPC ....... F16L 5/00; F16L 5/02; F16L 5/04; A62C 2/065
See application file for complete search history.

(56) References Cited

U.S. PATENT DOCUMENTS

| 5,155,957 A | * | 10/1992 | Robertson | ................. F16L 5/04 52/220.8 |
| 9,861,843 B2 | | 1/2018 | Paetow et al. | |

(Continued)

FOREIGN PATENT DOCUMENTS

| EP | 2 578 274 | 4/2013 |
| EP | 3 326 698 | 5/2018 |

OTHER PUBLICATIONS

International Search Report issued Feb. 11, 2020 in PCT/EP2019/082225, with English translation, 5 pages.

(Continued)

*Primary Examiner* — Gilbert Y Lee
(74) *Attorney, Agent, or Firm* — Grüneberg and Myers PLLC (57) ABSTRACT

A fire protection sleeve segment can be arranged for a fire protection sleeve for sealing a combustible body penetrating an opening in a wall or ceiling in the event of fire. The fire protection sleeve segment contains a first housing element and a second housing element, wherein the housing elements have a boundary wall containing a contact surface and an outer surface opposite the contact surface. The two housing elements are rigidly interconnected and arranged so as to be stepped with respect to one another. An intumescent material is applied to the contact surfaces. To form a fire protection sleeve, a plurality of fire protection sleeve segments are arranged relative to one another and interconnected such that the intumescent material applied on the contact surface of the first housing element is covered, in whole or in part, by the second housing element of the respectively adjacent fire protection sleeve segment.

19 Claims, 6 Drawing Sheets

(56) References Cited

U.S. PATENT DOCUMENTS

| | | | |
|---|---|---|---|
| 10,729,923 B2* | 8/2020 | Förg | ........................ H02G 3/22 |
| 2011/0210222 A1 | 9/2011 | Van Walraven | |
| 2013/0086856 A1 | 4/2013 | Paetow et al. | |
| 2017/0128757 A9 | 5/2017 | Paetow et al. | |
| 2019/0247686 A1* | 8/2019 | Förg | ........................ H02G 3/22 |

OTHER PUBLICATIONS

Written Opinion issued Feb. 11, 2020 in PCT/EP2019/082225, with English translation, 8 pages.

\* cited by examiner

FIRE PROTECTION SLEEVE SEGMENT AND FIRE PROTECTION SLEEVE

CROSS-REFERENCE TO RELATED APPLICATIONS

This application is the National Stage entry under § 371 of International Application No. PCT/EP2019/082225, filed on Nov. 22, 2019, and which claims the benefit of priority to European Application No. 18211215.1, filed on Dec. 10, 2018. The content of each of these applications is hereby incorporated by reference in its entirety.

BACKGROUND OF THE INVENTION

Field of the Invention

The invention relates to a fire protection sleeve segment and a fire protection sleeve composed of a plurality of fire protection sleeve segments for sealing, in the event of a fire, a combustible body which penetrates an opening in a wall or ceiling.

Description of Related Art

In order to prevent the spread of fire or smoke in buildings, openings in ceilings or walls, in which, for example, pipes or cables are guided, must be able to be closed in the event of a fire. For this purpose, various fire protection solutions are used, for example bandages or wraps that are mounted in the opening or as sleeves in front of the opening.

In order to provide fire protection, various fire protection means are used, for example in the form of inserts which are fastened to a housing. In particular, intumescent materials are suitable as fire protection means. In the event of fire, the intumescent material foams up due to the effect of heat and closes the opening, which prevents or at least delays the spread of smoke or fire.

Fire protection sleeves are advantageous in that they can be mounted outside the opening in front of the wall and thus can be heated more rapidly in the event of a fire, since the fire protection means is not passively cooled by the surrounding wall.

DE 10 2008 031 018 A1 discloses a fire protection sleeve which is attached around a pipeline and locked by means of a locking mechanism on the end. In an arrangement of this kind, however, each different pipe diameter requires a separate fire protection sleeve which is matched to the corresponding pipe diameter. As a result, a large number of designs have to be provided which, if necessary, also require separate tools for assembly.

DE 20 2010 007623 discloses a fire protection device which is composed of a plurality of housing segments, as a result of which the diameter of the finished fire protection device can be adapted to the relevant pipe. However, a system of this kind is only suitable for smaller pipe diameters, since the size of the individual housing segment has to be matched to the smallest expected pipe diameter. As a result, in the case of larger pipe diameters there is insufficient fire protection material available to ensure closure of the entire opening.

In order to close larger pipe diameters, DE 10 2004 055 928 B4 and DE 43 26 883 A1 disclose, for example, providing additional mechanical elements which, in the event of fire, pivot into the center of the opening in order to thereby distribute fire protection material within the opening or achieve a mechanical closure. However, systems of this kind are very expensive to manufacture and are therefore only suitable for special applications and very large pipe diameters.

SUMMARY OF THE INVENTION

The problem addressed by the invention is therefore that of providing a fire protection device which can be flexibly applied and is simultaneously cost-effective.

According to the invention, the problem is solved by a fire protection sleeve segment for a fire protection sleeve for sealing, in the event of a fire, a combustible body which penetrates an opening in a wall or ceiling, comprising a first housing element and a second housing element which is rigidly connected to the first housing element, wherein the housing elements each have a boundary wall comprising a contact surface and an outer surface opposite the contact surface, wherein the two housing elements are arranged so as to be stepped with respect to one another, and wherein an intumescent material is applied to the contact surfaces.

By providing a fire protection sleeve segment of this kind, a fire protection sleeve can be composed from a plurality of these fire protection sleeve segments and thus be adapted to a desired pipe diameter.

The stepped arrangement of the housing elements of the fire protection sleeve segment ensures that a plurality of the fire protection sleeve segments can be arranged at a variable distance from one another and simultaneously in a stable manner. Furthermore, this produces arrangements which require less intumescent material, since the amount of the intumescent material can be varied by moving the sleeve segments depending on the pipe diameter.

Constructing the fire protection sleeve from the individual fire protection sleeve segments also allows cost-effective and simple production. For example, irrespective of the pipe diameter and the size of the fire protection sleeve, each fire protection sleeve segment can be produced by means of stamping from a metal plate using the same tool.

In the event of a fire, the intumescent material expands and thus ensures that the opening is closed as soon as the combustible body penetrating the opening collapses.

Applying the intumescent material on the contact surfaces facing the combustible body ensures that said material already points in the direction of the opening to be closed.

In a preferred embodiment, the first housing element has a first end wall which can be arranged substantially perpendicular, i.e. at an angle of approximately 90°±15°, to the boundary wall and which limits the intumescent material applied to the contact surface. Preferably, the first end wall is rigidly, preferably integrally, connected to the boundary wall of the second housing element via a first predetermined bending edge. In so doing, the second housing element can preferably move at the first predetermined bending edge under the action of force. Due to the stepped arrangement of the housing elements, the second housing element is above the first housing element of an adjacent fire protection sleeve segment when in use. As a result, the intumescent material comprised by the first housing element can expand in the event of a fire, act on the second housing element of the adjacent fire protection sleeve segment and actively move said element into the center of the opening to be sealed. In so doing, a larger pipe opening can be closed faster using intumescent material, since said material is transported in the direction of the center of the pipe opening by the movement of the second housing element.

The integral design can ensure a stable connection between the first and the second housing element, and simple production of the individual segments is possible, for example by means of stamping.

In order to provide a way of fastening a plurality of fire protection sleeve segments together, the first housing member can comprise a tab on its outer surface.

Furthermore, the first housing element can comprise a strip on the side of the boundary wall that is opposite the first end wall, which strip is preferably a metal strip, preferably a metal strip integrally connected to the boundary wall. The metal strip preferably projects in the longitudinal direction of the boundary wall and can be guided into the tab of the first housing element of an adjacent fire protection sleeve segment and fastened thereto. This provides an easy way of connecting a plurality of fire protection sleeve segments to form a fire protection sleeve.

In a preferred embodiment, the metal strip comprises recesses on at least one edge or is provided with perforations at which the metal strip can be bent. This provides a simple way of fastening the metal band to the tab and fixing it in position relative to the adjacent fire protection sleeve segment. By introducing a plurality of perforations along the extension direction of the metal strip, the distance between the interconnected fire protection sleeve segments can be selectively adjusted, since the metal strip can be bent at each of these perforations.

In a further preferred embodiment, the metal strip can have irregularities, preferably ribs or other latching elements, on the surface thereof. These irregularities can hook on the tab of the adjacent fire protection sleeve segment in the manner of a cable tie and thereby establish a secure connection.

The first housing element can also have a second end wall which is also arranged substantially perpendicular, i.e. at an angle of approximately 90°±15°, to the boundary wall and which is opposite the first end wall. Preferably, the second end wall is rigidly, preferably integrally, connected to a first shield via a second predetermined bending edge, wherein the first shield is arranged at least in part above the intumescent material on the contact surface of the first housing element. The first shield covers the intumescent material applied to the contact surface of the first housing element at least in part. The intumescent material is therefore additionally mechanically secured by the first shield, as a result of which material loss, for example caused by aging processes, can be prevented.

The second predetermined bending edge ensures that the shield can be folded over easily and that the intumescent material on the contact surface of the first housing element, which material expands in the event of fire, can press the shield to the side and spread unhindered into the opening to be closed. At the same time, the first shield can act on the second housing element of the adjacent fire protection sleeve segment that is located above the shield and press it in the direction of the center of the opening.

A lateral wall is preferably arranged substantially perpendicular, i.e. at an angle of approximately 90°±15°, to the boundary wall of the first housing element, which lateral wall adjoins the first end wall and optionally the second end wall and limits the intumescent material on the side of the housing element that faces away from the wall or ceiling when in use.

In order to ensure a way of fastening to the wall or ceiling, a fastening element can be attached to the outer surface of the boundary wall of the first housing element. The fastening element preferably has a recess through which a suitable fastening means can be guided. The fastening element is arranged on the side of the housing element that faces the wall or ceiling when in use, and projects from the outer surface of the boundary wall in a direction away from the combustible body. The housing element can be screwed or riveted to the wall or ceiling by means of the fastening element, for example.

In a preferred embodiment, the first housing element can have a projection on its outer surface, preferably at the height of the fastening element. This makes it possible to stack a plurality of fire protection sleeve segments axially one on top of the other and thus to form a plurality of interconnected rings of fire protection sleeves. In this case, the fastening element of the individual fire protection sleeve segments can be designed such that the recess can be plugged onto the projection of the axially adjacent fire protection sleeve segment, and thereby a secure connection between the two fire protection sleeve segments is established.

In a further preferred embodiment, the second housing element can have a third end wall opposite the first predetermined bending edge, which third end wall is arranged substantially perpendicular, i.e. at an angle of approximately 90°±15°, to the boundary wall of the second housing element and limits the intumescent material applied to the contact surface of the second housing element. Preferably, the third end wall is rigidly, preferably integrally, connected to a second shield, wherein the second shield covers the intumescent material on the contact surface of the second housing element at least in part, and wherein a third predetermined bending edge is preferably provided between the second shield and the third end wall. In this way, similarly to the first shield, intumescent material can be mechanically secured on the contact surface of the second housing element using the second shield. The third predetermined bending edge ensures that the shield bends to the side, in the direction of the opening to be closed, in the event of fire due to the expansion of the intumescent material on the contact surface of the second housing element, such that the intumescent material can close the opening unhindered. In addition, the shield which is bent toward the center of the combustible body in the event of fire ensures mechanical stabilization of the expanded intumescent material. As a result, the opening is closed more securely, and less intumescent material can be used while maintaining a stable closure.

In order to more securely close particularly large openings in the event of fire, an intumescent material can also be applied to the second shield, preferably at least on the side thereof facing the contact surface of the second housing element. In this way, the second shield is not only used for mechanical stabilization, but also introduces additional intumescent material into the opening to be closed.

The second housing element preferably also has a lateral wall which is arranged substantially perpendicular, i.e. at an angle of approximately 90°±15°, to the boundary wall of the second housing element and which adjoins the third end wall. The intumescent material on the contact surface of the second housing element is therefore limited by the lateral wall on the side of the housing element that faces away from the wall or ceiling when in use.

The intumescent material can comprise or consist of expandable graphite. Expandable graphite is a cost-effective intumescent material and additionally has particularly favorable properties. The expandable graphite which expands in the event of fire develops a sufficiently large force which can cause a movement of the second housing element and/or the first and second shield in the direction of the opening to be closed. In addition, expanded expandable graphite is largely temperature-resistant and thus produces a secure closure in the event of fire.

Moreover, the intumescent material can comprise other additives which are known in the prior art, such as blowing agents, acid formers, ash formers and ablation agents.

The fire protection sleeve segments according to the invention can be easily assembled to form a fire protection sleeve which can be wrapped around the combustible body which penetrates the opening in the wall or ceiling.

The invention therefore also relates to a fire protection sleeve comprising a plurality of the above-described fire protection sleeve segments, characterized in that the fire protection sleeve segments are arranged relative to one another such that the intumescent material applied on the contact surface of the first housing element is covered by the second housing element of an adjacent fire protection sleeve segment at least in part.

In a first preferred embodiment, the adjacent fire protection sleeve segments are arranged without spacing from one another such that the second housing element comes to lie flush over the first housing element of an adjacent fire protection sleeve segment. This embodiment is made possible by the stepped arrangement of the first and second housing element of each fire protection sleeve segment. Since in so doing at least two layers of the intumescent material are always superimposed, large openings can also be closed in the event of fire. In an arrangement of this kind, the second housing element is advantageously moved in the direction of the opening to be closed by the expanding intumescent material of the underlying first housing element of the adjacent fire protection sleeve segment.

In a further embodiment of a fire protection sleeve which comprises a plurality of the above-described fire protection sleeve segments, the fire protection sleeve segments are arranged at a spacing from one another such that at least part of the intumescent material applied on the contact surface of the first housing element is not covered by the second housing element of the respectively adjacent fire protection sleeve segment. An elongate arrangement of this kind is advantageous in that, in particular in the case of smaller openings, two or more layers of the intumescent material do not have to lie on top of one another at each point of the fire protection sleeve, while it is simultaneously ensured that at least one layer of the intumescent material is present at every point in the opening in an amount sufficient for fire protection. This can achieve significant material savings.

Since, in the described elongate arrangement, the intumescent material on the contact surface of the first housing element only acts on the end of the adjacent second housing element, this produces a particularly good lever ratio of the action of force on the second housing element at the first predetermined bending edge. As a result, the second housing element is moved in the direction of the center of the opening particularly prematurely.

Lastly, the invention relates to the use of a fire protection sleeve according to the above-described embodiments for sealing, in the event of fire, a combustible body which penetrates an opening in a wall or ceiling, wherein the fire protection sleeve is arranged around the combustible body such that the intumescent material on the contact surfaces of the first and second housing element faces the body and the respective outer surfaces of the boundary walls face away from the combustible body, and wherein a plurality of layers of intumescent material are arranged one behind the other at least in portions.

Further advantages and properties of the invention can be found in the following description and the drawings to which reference is made. In the drawings.

Figure 1:
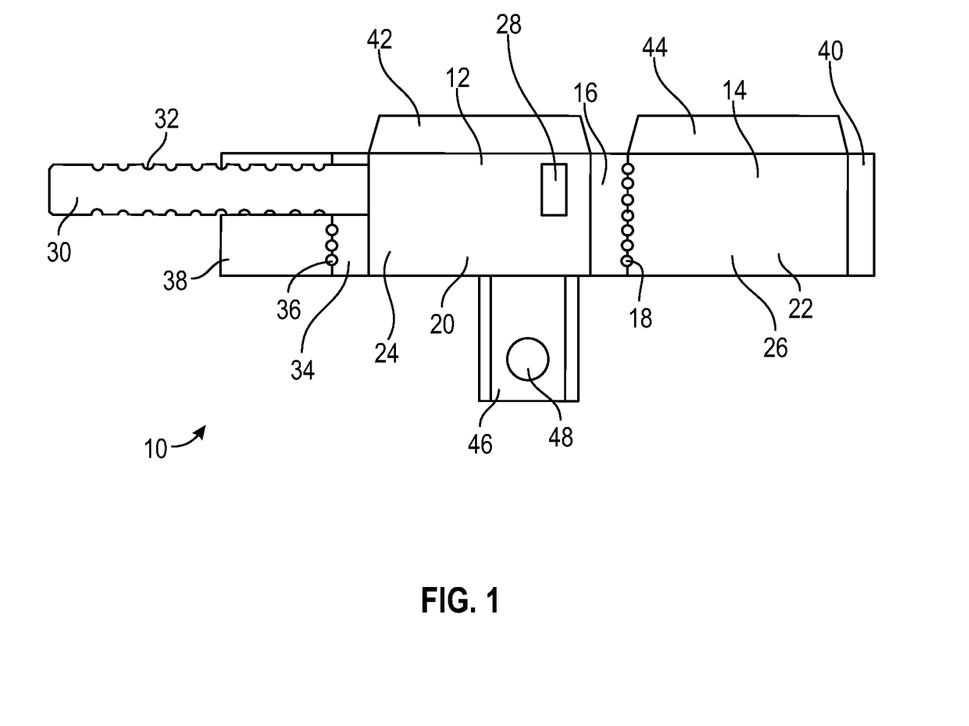
FIG. 1 shows a housing of a fire protection sleeve segment according to the invention in the form of a punched part.

FIG. 1 shows a housing for a fire protection sleeve segment 10 according to the invention in the form of a stamped part, comprising a first housing element 12 and a second housing element 14, wherein the first housing element 12 and the second housing element 14 are rigidly interconnected via a first end wall 16 of the first housing element 12 at a first predetermined bending edge 18.

The first housing element 12 and the second housing element 14 each have a boundary wall 20 and 22, respectively, comprising an outer surface 24 and 26, respectively.

A tab 28 is located on the outer surface 24 of the first housing element 12.

Additionally, a metal strip 30 connected to the boundary wall 20 is located on a side of the first housing element 12 that is opposite the first end wall 16, which metal strip projects therefrom in the longitudinal direction of the first housing element 12.

The metal strip 30 comprises perforations 32 on its edges, at which perforations the metal strip 30 can be bent.

The first housing element 12 additionally comprises, on the side thereof opposite the first end wall 16, a second end wall 34 which is connected to a first shield 38 via a second predetermined bending edge 36. According to an alternative embodiment, the first housing element 12 can only have the metal band 30 on this side.

Furthermore, a third end wall 40 is located on a side of the second housing element 14 that is opposite the first predetermined bending edge 18.

Furthermore, a first lateral wall 42 and a second lateral wall 44 are provided on the first housing element 12 and on the second housing element 14, respectively.

A fastening element 46 comprising a recess 48 also protrudes from the first housing element 12 in the transverse direction thereof.

All of the components of the embodiment shown in FIG. 1 are preferably integrally rigidly interconnected. For example, the entire housing could be stamped out of sheet steel. In principle, however, it is also conceivable for a plurality of the individual parts to merely be welded together, soldered or interconnected by means of plug-in connections.

Figure 2A:
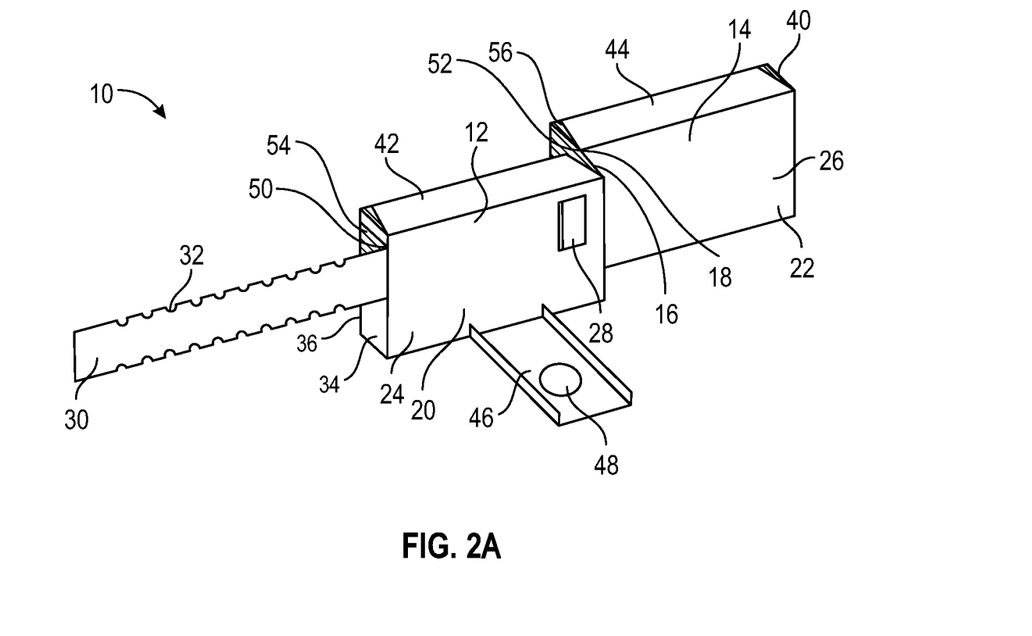
FIG. 2A is a perspective view of a fire protection sleeve segment according to the invention.

FIG. 2A shows a fire protection sleeve segment, as can be folded from a stamped part produced similarly to FIG. 1.

The first housing member 12 and the second housing member 14 are arranged so as to be stepped with respect to one another. The step is formed at the first predetermined bending edge 18 between the first housing element 12 and the second housing element 14. The first end wall 16 is arranged substantially perpendicular to the boundary wall 20 and thus limits a contact surface 50 on the first housing element 12. The third end wall 40 is substantially perpendicular to the boundary wall 22 and limits the contact surface 52 on the second housing element 14.

The lateral walls 42 and 44 are also bent such that they are substantially perpendicular to the boundary surfaces '20 and 22 and limit the contact surfaces 50 and 52.

An intumescent material 54 and 56 is applied to each of the contact surfaces 50 and 52 of the first housing element 12 and the second housing element 14, respectively. The intumescent material 54 and 56 can be adhered to the contact surfaces 50 and 52, for example.

The intumescent material in the embodiment shown comprises expandable graphite. In principle, however, other fire protection materials are also conceivable, for example polymer-bound intumescent compositions based on melamine, ammonium polyphosphate and polyols, optionally together with expandable graphite and/or ablation agents such as aluminum trihydroxide.

The second end wall 34 on the first housing element 12 is bent such that it faces the first end wall 16, and such that the first shield 38 comes to lie above the intumescent material 56 in the first housing element 12.

In FIG. 2A it can be seen that the first end wall 16, the second end wall 34 and the third end wall 40 are so wide that they laterally cover the intumescent material 54 and 56, respectively. This prevents the intumescent material 54 and 56 from laterally falling out.

However, in the embodiment shown, the second end wall 34 has a recess which corresponds to the width of the metal strip 30. This is due to the fact that the housing of the fire protection sleeve segment 10 has been produced as a stamped part. If the metal strip 30 is produced individually and then fastened, for example welded or soldered, to the first housing element 12, the second end wall 34 can also completely cover the intumescent material 54.

The fastening element 46 is arranged perpendicular to the outer surface 24 of the first housing element 12. In so doing, the fastening element 46 can be attached, for example screwed, on a wall or ceiling through which an opening 58 extends.

Figure 2B:
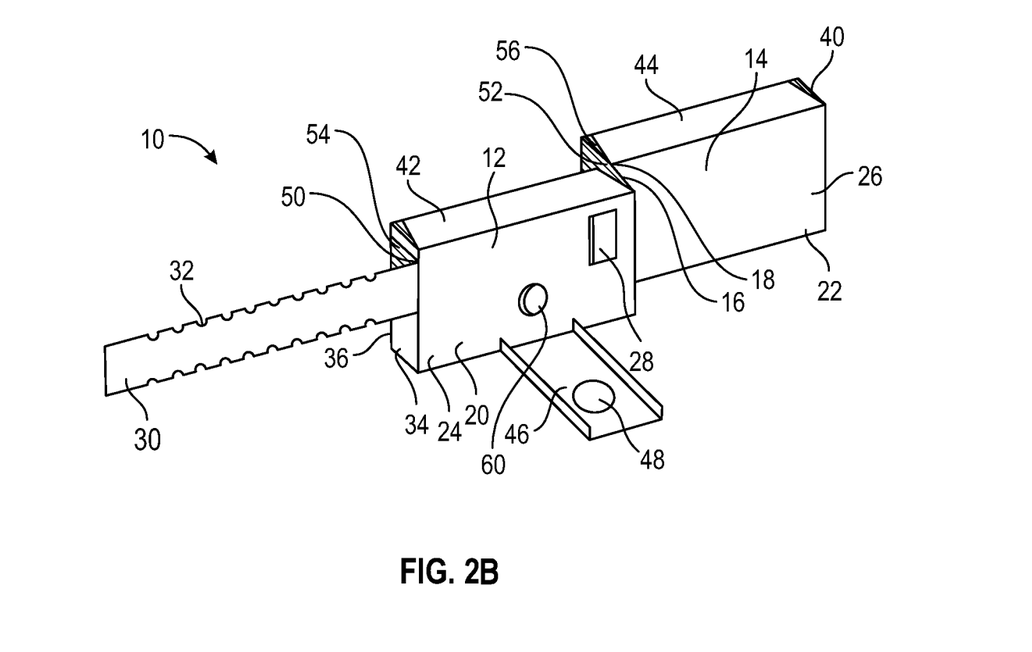
FIG. 2B shows an alternative embodiment of the fire protection sleeve segment.

FIG. 2B shows an alternative embodiment of the fire protection sleeve segment 10 from FIG. 2A, in which the first housing element 12 also has a projection 60 on its outer surface 24. This is arranged in this case such that the recess 48 of the fastening element 46 of a second fire protection sleeve segment 10 which is stacked axially on top of the first fire protection sleeve segment 10 could be anchored to the projection 60 of the first fire protection sleeve segment 10. The fastening element 46 of the second fire protection sleeve segment would then lie approximately in one plane together with the boundary wall 20. In so doing, two fire protection sleeve segments 10 which are arranged axially one on top of the other can be interconnected by means of the fastening element 46.

The fastening element 46 can be provided at various positions relative to the tab 28 on the first housing element 12, as shown in FIG. 1 and FIG. 2B. If a projection 60 is provided, the fastening element 46 is advantageously not attached at the height of the tab 28, and a secure connection between the fastening element 46 and a projection 60 on the outer surface 20 of the first housing element 12 arranged axially below the second fire protection sleeve segment 10 is ensured thereby.

Figure 3:
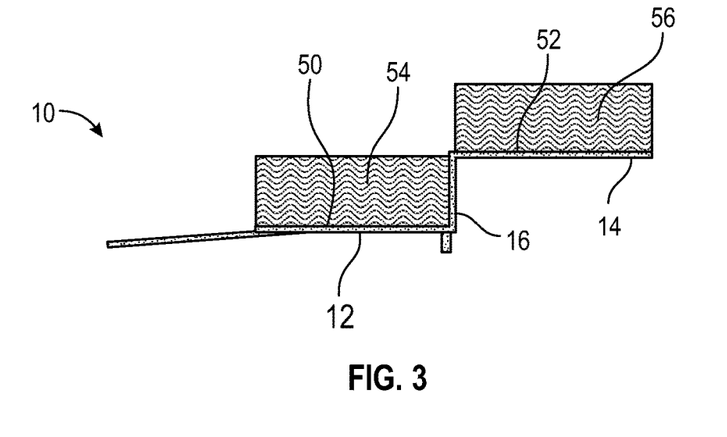
FIG. 3 is a schematic sectional view of a fire protection sleeve segment comprising intumescent material.

FIG. 3 is a schematic sectional view of an embodiment of the fire protection sleeve segment 10, in which only the first end wall 16 is shown. The two housing elements 12 and 14 are arranged so as to be stepped relative to one another and each have an intumescent material 54 and 56 on the contact surfaces 50 and 52 thereof, respectively.

Figure 4:
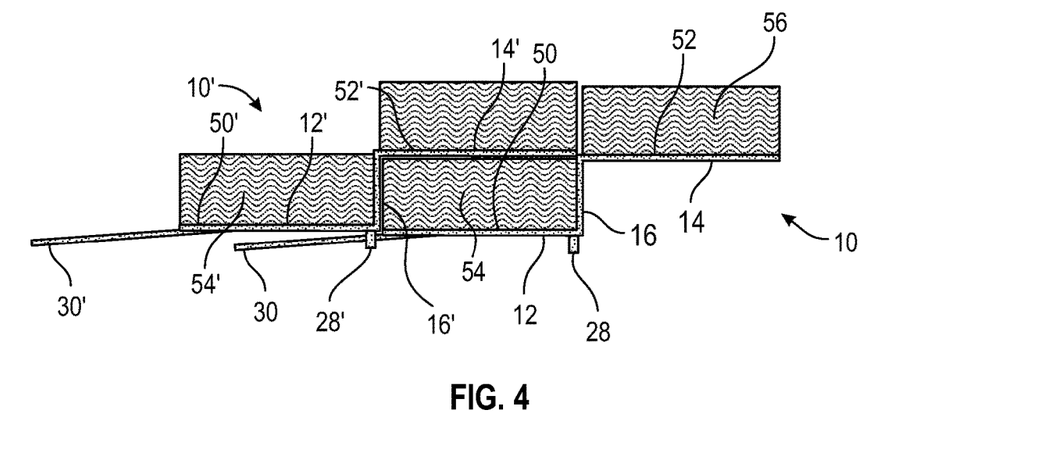
FIG. 4 is a schematic sectional view of two interconnected fire protection sleeve segments arranged without spacing.

In FIG. 4, two of the fire protection sleeve segments shown in FIG. 3 are arranged without spacing from one another. In this case, the metal strip 30 of the first fire protection sleeve segment 10 engages in the tab 28' of the adjacent fire protection sleeve segment 10' and thus ensures a secure connection between the two fire protection sleeve segments 10 and 10'.

In the embodiment shown in FIG. 4, the metal strip 30 is not bent, but instead has irregularities (not shown), for example ribs or latching elements, on the surface thereof, which irregularities hook in the tab 28' and thus ensure a secure connection.

Figure 5:
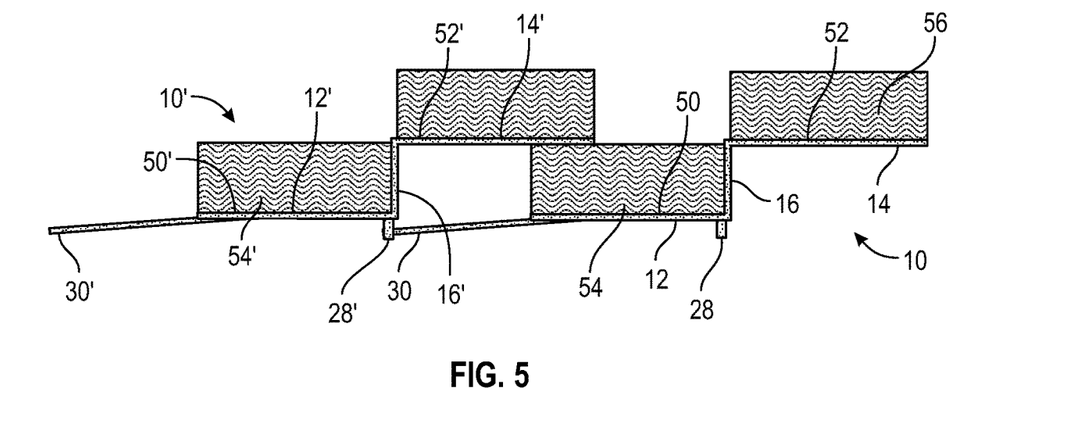
FIG. 5 is a schematic sectional view of two interconnected fire protection sleeve segments in an elongate arrangement.

FIG. 5 shows an elongate arrangement of two fire protection sleeve segments 10 and 10', in which the fire protection sleeve segments 10 and 10' are arranged at a spacing from one another, and in which the second housing element 14' of the fire protection sleeve segment 10' only covers the intumescent material 54 on the first housing element 12 of the fire protection sleeve segment 10 in part.

Figure 6:
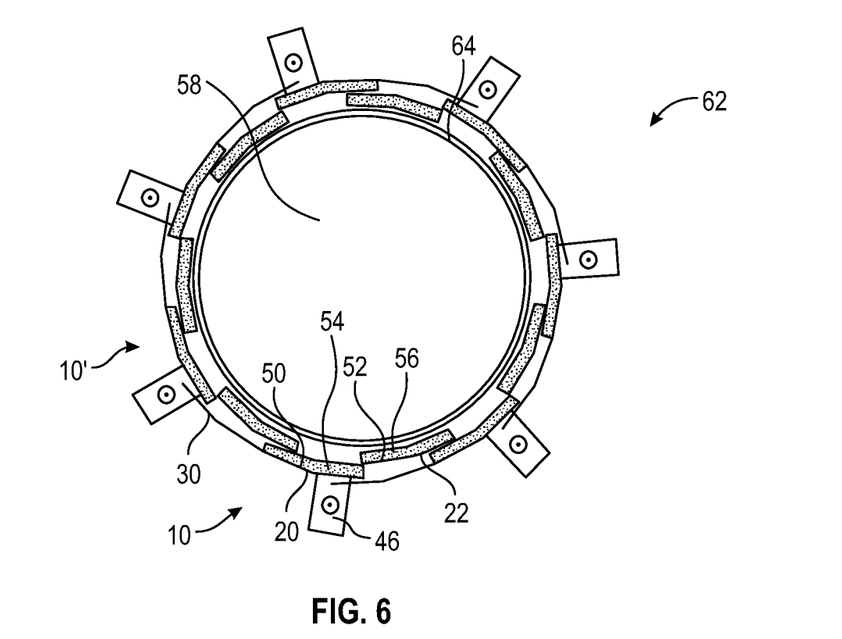
FIG. 6 is a schematic plan view of a fire protection sleeve according to the invention, in the direction of the opening to be closed.
Figure 7:
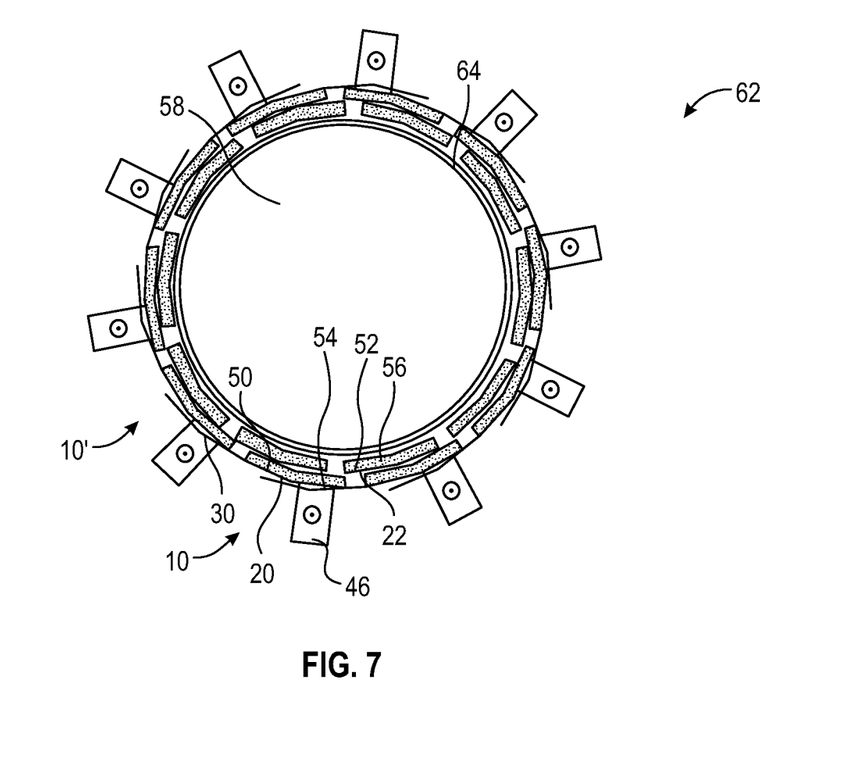
FIG. 7 is a further schematic plan view of a fire protection sleeve according to the invention, in the direction of the opening to be closed.

FIGS. 6 and 7 show fire protection sleeves 62 which are arranged in front of a wall (not shown) around an opening 58 of a combustible body 64 and comprise a plurality of interconnected fire protection sleeve segments 10. The combustible body 64 is preferably a pipe, in particular a plastics pipe, or a cable duct.

For assembly, a plurality of the fire protection sleeve segments 10 are rigidly interconnected by means of the metal strips 30, wherein the number of fire protection sleeve segments 10 used is adapted to the diameter of the combustible body 64. Subsequently, the chain of fire protection sleeve segments 10 formed thereby is wrapped around the combustible body 64 and the end fire protection sleeve segments 10 are connected by means of the metal strip 30.

The fastening elements 46 project substantially perpendicular from the boundary wall 20, are applied to the wall (not shown) and are then rigidly connected, for example screwed, to the wall. In this way, the fire protection sleeve 62 is securely fixed to the wall around the combustible body 64.

In the initial position, the stepped fire protection sleeve segments 10 are arranged around the combustible body 64 such that the contact surfaces 50 and 52, and thus also the intumescent material 54 and 56, point in the direction of the combustible body 64. The outer surfaces 24 and 26 of the boundary walls 20 and 22 respectively point away from the combustible body 64. At the same time, the lateral walls 42 and 44 are arranged on the side of the fire protection sleeve that faces away from the wall. As a result, the lateral walls 42, 44 limit the intumescent material 54 and 56 and thereby prevent it from being able to fall out of the assembled fire protection sleeve 62 and/or from expanding away from the opening to be closed in the event of fire.

The embodiments shown in FIG. 6 and FIG. 7 differ in how large the spacing between successive fire protection sleeve segments 10 and 10' is selected to be.

The size of the spacing between a plurality of fire protection sleeve segments 10 and 10' depends on the size of the opening 58 to be closed. In Table 1, examples are given for how much intumescent material can be saved for a given diameter of the combustible body by selecting the number of fire protection segments per sleeve. For this purpose, 64 different pipes having different diameters were tested as combustible bodies.

TABLE 1

Required number of fire protection segments for different pipe diameters.

| Pipe diameter [mm] | Number of segments (arranged without spacing) | Number of segments (elongate arrangement) | Mass saving of intumescent material [%] |
|---|---|---|---|
| 180 | 6 | 4 | 33.3 |
| 200 | 6 | 5 | 16.7 |
| 225 | 7 | 6 | 14.3 |
| 250 | 8 | 7 | 12.5 |
| 300 | 9 | 8 | 11.1 |
| 315 | 10 | 9 | 10.0 |
| 350 | 11 | 10 | 9.1 |
| 400 | 13 | 12 | 7.7 |

It is clear that, especially in the case of small pipe diameters, a significant saving of intumescent material can be achieved without impairing the fire protection. For very large pipe diameters, it is advisable to choose the arrangement without spacing to ensure that sufficient intumescent material is present for completely closing the opening 58.

In the event of a fire, the combustible body 64 melts away or burns such that the opening 58 is exposed and has to be closed in order to prevent the spread of fire and smoke to adjacent rooms. The intumescent material 54 and 56 is heated by the fire such that it begins to expand as the combustible body 64 softens. The intumescent material 54 which is applied on the contact surface 50 of the first housing element 12 thereby acts with a force on the second housing element 14' of the adjacent fire protection sleeve segment 10', as a result of which said second housing element moves along the first predetermined bending edge 18 in the direction of the opening 58. At the same time, the intumescent material 56 applied to the contact surface 52 expands.

Figure 8:
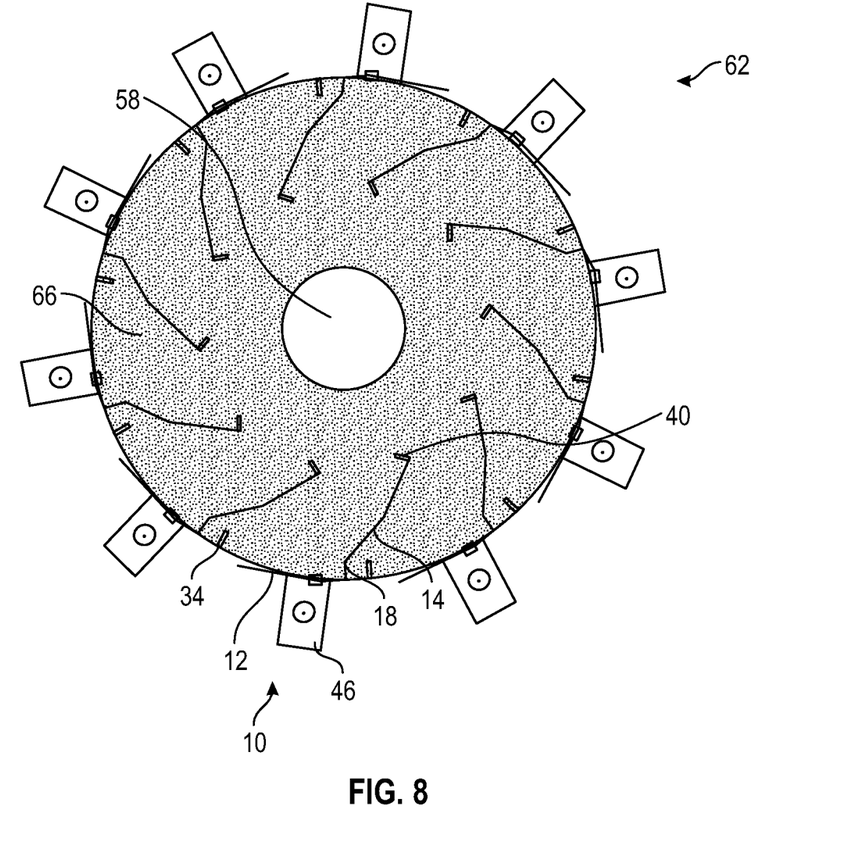
FIG. 8 shows a fire protection sleeve when activated, while an opening is closing.

FIG. 8 shows the arrangement shown in FIG. 7 during intumescence. The second housing elements 14 have moved along the first predetermined bending edge 18 in the direction of the center of the opening 58. As a result, they are arranged in an iris shape within the opening 58 and the expanded intumescent material 66. The expanded intumescent material 66 finally completely closes the opening 58.

Figure 9:
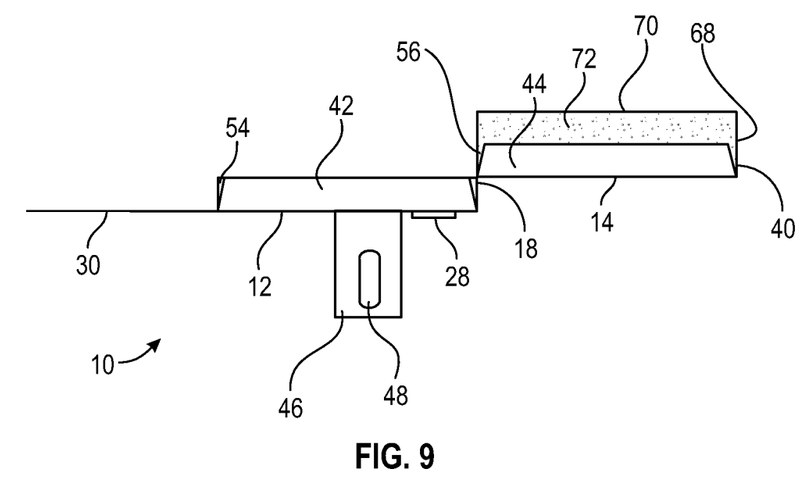
FIG. 9 is a schematic view of an alternative embodiment for a fire protection sleeve segment.

FIG. 9 shows an alternative embodiment of the fire protection sleeve segment 10. In this embodiment, the third end wall 40 of the second housing element 14 is rigidly connected to a second shield 70 via a third predetermined bending edge 68. On the side facing the contact surface 52 of the second housing element 14, additional intumescent material 72 is applied to the second shield 70. Moreover, in FIG. 10 the recess 48 has a non-circular shape, as in the previously shown embodiments.

Figure 10:
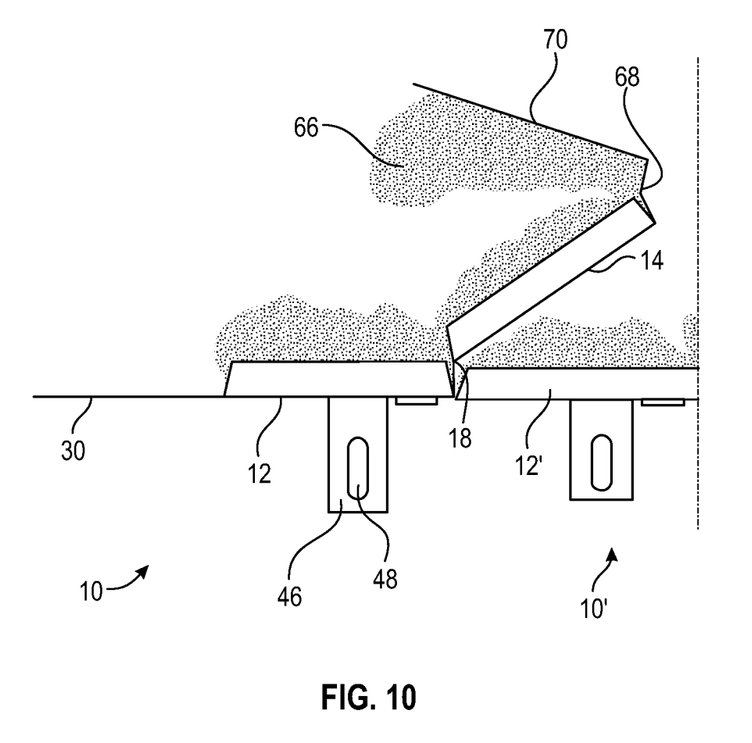
FIG. 10 shows the fire protection sleeve segment from FIG. 4 during intumescence.

FIG. 10 shows two interconnected fire protection sleeve segments 10 and 10' according to the embodiment of FIG. 4 during intumescence. In the event of fire, the second housing element 14 is moved along the first predetermined bending edge 18 in the direction of the center of the opening 58, as in the previously described embodiments. The second shield 70 is pushed away by the expanding intumescent material 56 on the contact surface of the second housing element 14 and folds along the third predetermined bending edge 68, counter to the movement of the second housing element 14. In the event of fire, additional intumescent material 72 can therefore be transported into the center of the opening 58 to be closed.

A fire protection sleeve according to the invention consisting of eight interconnected fire protection sleeve segments was tested in a fire test according to the test standard EN1366-3_2009. For this purpose, the fire protection sleeve was fastened to a polypropylene pipe (Aquaterm Blue Pipe SDR 17.6, diameter 250 mm, thickness 14.2 mm) which penetrated a 100 mm aerated concrete wall. The fire protection sleeve contained a total of 1.28 kg of intumescent material. An F&T rating of 120 minutes was achieved in the fire test. The F rating indicates the minimum amount of time in which it was possible to show that the spread of fire was being prevented. The T rating indicates the amount of time within which the temperature of a measuring point on an installation on the side of a wall or ceiling duct facing away from the fire increases by 180K, compared to the initial temperature. The temperature of 180 K above room or ambient temperature is also referred to as the critical temperature. This ensures that the temperature on the wall side facing away from the fire does not reach the flash point of any of the materials on this side of the wall, thus preventing self-ignition due to increased temperature.

The invention claimed is:

1. A fire protection sleeve segment for a fire protection sleeve for sealing, in the event of fire, a combustible body which penetrates an opening in a wall or ceiling, the fire protection sleeve segment comprising a first housing element and a second housing element which is rigidly connected to the first housing element,
   wherein the first and second housing elements each have a boundary wall comprising a contact surface and an outer surface opposite the contact surface,
   wherein the first and second housing elements are arranged so as to be stepped with respect to one another, and
   wherein an intumescent material is applied to the contact surfaces;
   wherein the first housing element has a first end wall which is rigidly connected to the second housing element via a first predetermined bending edge.

2. The fire protection sleeve segment according to claim 1, wherein the first housing element has a tab on the outer surface thereof.

3. The fire protection sleeve segment according to claim 1, wherein the first housing element has a metal strip on the side opposite the first end wall.

4. The fire protection sleeve segment according to claim 3, wherein the metal strip has recesses, on at least one edge, at which recesses the metal strip can be bent.

5. The fire protection sleeve segment according to claim 4, wherein the recesses are perforations.

6. The fire protection sleeve segment according to claim 3, wherein the metal strip has irregularities, on the surface thereof.

7. The fire protection sleeve segment according to claim 6, wherein the irregularities are ribs or latching elements.

8. The fire protection sleeve segment according to claim 3, wherein the metal strip is integrally connected to the boundary wall.

9. The fire protection sleeve segment according to claim 1, wherein the first housing element has a second end wall which is connected to a first shield via a second predetermined bending edge, the first shield being arranged at least in part above the contact surface of the first housing element.

10. The fire protection sleeve segment according to claim 1, wherein a fastening element, is attached to the outer surface of the first housing element.

11. The fire protection sleeve segment according to claim 10, wherein the first housing element has a projection on the outer surface thereof at a height of the fastening element.

12. The fire protection sleeve segment according to claim 10, wherein the fastening element comprises a recess.

13. The fire protection sleeve segment according to claim 1, wherein the second housing element has a third end wall opposite the first predetermined bending edge, which third end wall is connected to a second shield, the second shield covering the intumescent material on the contact surface of the second housing element at least in part, and a third predetermined bending edge.

14. The fire protection sleeve segment according to claim 13, wherein an intumescent material is applied to the second shield at least on the side thereof facing the contact surface of the second housing element.

15. The fire protection sleeve segment according to claim 13, wherein the third predetermined bending edge is provided between the third end wall and the second shield.

16. The fire protection sleeve segment according to claim 1, wherein the intumescent material comprises or consists of expandable graphite.

17. A fire protection sleeve, comprising a plurality of the fire protection sleeve segments according to claim 1, wherein the fire protection sleeve segments are arranged relative to one another such that the intumescent material applied on the contact surface of the first housing element is covered, in whole or in part, by the second housing element of the respectively adjacent fire protection sleeve segment.

18. A fire protection sleeve, comprising a plurality of the fire protection sleeve segments according to claim 1, wherein the fire protection sleeve segments are arranged so as to be spaced from one another such that at least part of the intumescent material applied on the contact surface of the first housing element is not covered by the second housing element of the respectively adjacent fire protection sleeve segment.

19. A method for sealing, in the event of fire, a combustible body which penetrates an opening in a wall or ceiling, the method comprising:
   arranging the fire protection sleeve according to claim 17 around a combustible body such that the intumescent material faces the combustible body and the respective outer surfaces of the boundary walls face away from the combustible body, and wherein a plurality of layers of intumescent material are arranged one behind the other at least in portions.

* * * * *